US011535171B2

(12) United States Patent
Mutsura et al.

(10) Patent No.: US 11,535,171 B2
(45) Date of Patent: Dec. 27, 2022

(54) SPEAKER DISPOSITION STRUCTURE OF VEHICLE

(71) Applicant: Mazda Motor Corporation, Hiroshima (JP)

(72) Inventors: Kiyoshi Mutsura, Aki-gun (JP); Kouki Hirao, Aki-gun (JP); Koji Wakamatsu, Aki-gun (JP); Hiroshi Yamanaka, Aki-gun (JP); Mayumi Fujimoto, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 17/482,451

(22) Filed: Sep. 23, 2021

(65) Prior Publication Data
US 2022/0089099 A1 Mar. 24, 2022

(30) Foreign Application Priority Data

Sep. 23, 2020 (JP) .............................. JP2020-158369

(51) Int. Cl.
*B60R 11/00* (2006.01)
*B60R 11/02* (2006.01)
*B62D 25/02* (2006.01)
*B62D 25/04* (2006.01)

(52) U.S. Cl.
CPC ........ *B60R 11/0217* (2013.01); *B62D 25/025* (2013.01); *B62D 25/04* (2013.01)

(58) Field of Classification Search
CPC ..... B60R 11/00; B60R 11/0207; B62D 25/04; B62D 25/025
USPC .................................. 296/1.07, 193.06, 209
See application file for complete search history.

(56) References Cited

U.S. PATENT DOCUMENTS

2014/0327271 A1    11/2014  Kishima et al.
2020/0108781 A1*    4/2020  Kataoka .................. B62D 25/04

FOREIGN PATENT DOCUMENTS

JP     2018-167709 A   11/2018
WO   2013/084324 A1    6/2013

* cited by examiner

*Primary Examiner* — Dennis H Pedder
(74) *Attorney, Agent, or Firm* — Xsensus LLP

(57) ABSTRACT

A speaker disposition structure comprises a hinge pillar extending in a vehicle up-down direction; a side sill extending in a vehicle front-rear direction; a speaker box fixed to the hinge pillar; and a gap portion for arranging a vehicle component at an upper part of a vehicle-interior side of the side sill. The speaker box includes an abutting part abutting the hinge pillar; an upper space portion that bulges inward in a vehicle width direction from the abutting part above the gap portion and that holds a speaker; and an extended space portion that extends downward from the upper space portion and is adjacent to a vehicle-width-direction inner side of the gap portion. A dimension in a cross section orthogonal to the vehicle front-rear direction is smaller in a lower portion of the extended space portion than in an upper portion of the extended space portion.

20 Claims, 8 Drawing Sheets

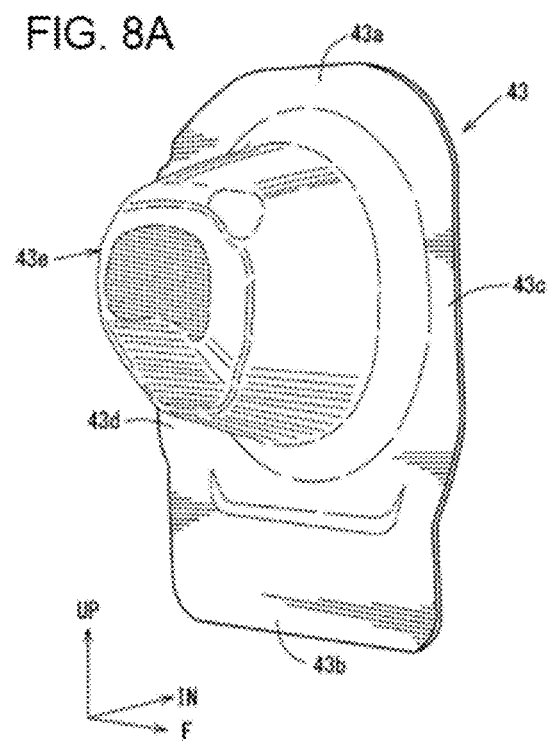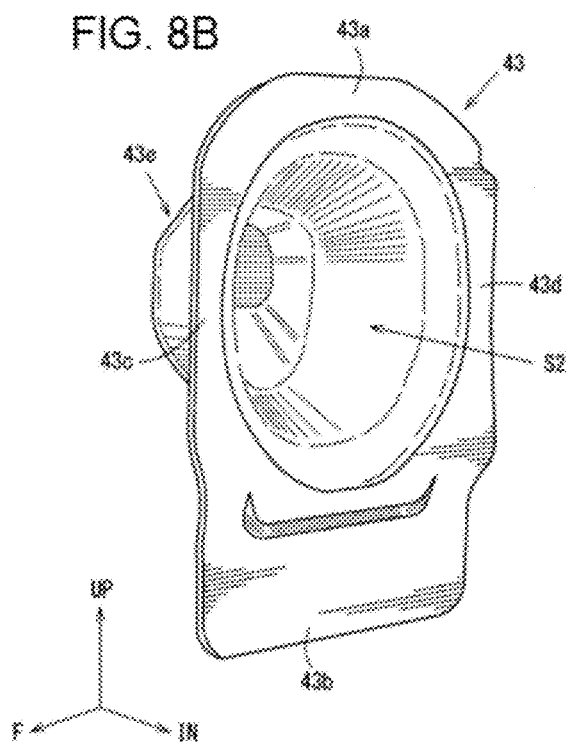

SPEAKER DISPOSITION STRUCTURE OF VEHICLE

CROSS-REFERENCE TO RELATED APPLICATION

The present application claims priority to JP 2020-158369, filed in Japan on Sep. 23, 2020, the entire disclosure of which is incorporated herein by reference.

TECHNICAL FIELD

The present disclosure relates to a speaker disposition structure of a vehicle, more specifically to a speaker disposition structure of a vehicle, including: a hinge pillar extending in a vehicle up-down direction; a side sill fixed to a lower end of the hinge pillar and extending in a vehicle front-rear direction; a speaker box that holds a speaker and is fixed to the hinge pillar in a vicinity of the side sill; and a gap portion for arranging a vehicle component at an upper part of the vehicle-interior side of the side sill.

BACKGROUND

In general, when a sufficient capacity of a speaker box is secured, sufficient air compression and expansion can be obtained inside the speaker box, and expected sound can be output to the inside of a vehicle cabin. Therefore, for the speaker box fixed to a hinge pillar, expansion of the speaker box inward of the vehicle cabin is required for the purpose of securing the capacity of the speaker box and improving the bass reproduction efficiency. If the speaker box is expanded inward in a vehicle width direction, the space in the vehicle cabin becomes narrower, and thus it is difficult to expand the speaker box inward in the vehicle width direction.

Hence, it is considered to expand the speaker box downward from an upper space portion, and to locate the speaker box adjacent, in the vehicle width direction, to a gap portion, above a side sill, for arranging a vehicle component (e.g. a wire harness) therein. In this case, if the space inside the speaker box in a section adjacent to the gap portion is excessively narrowed, resistance that impedes the flow of air in the speaker box becomes larger, causing a problem of disabling reproduction of expected bass during sound reproduction from the speaker.

Conventionally, there is a structure in which a speaker box is mounted on a hinge pillar in the vicinity of a side sill. For example, a structure in which a wire harness as a vehicle component is arranged at an upper part of the vehicle-interior side of a side sill.

SUMMARY

A speaker disposition structure of a vehicle according to the present disclosure includes a hinge pillar extending in a vehicle up-down direction; a side sill fixed to a lower end of the hinge pillar and extending in a vehicle front-rear direction; a speaker box that holds a speaker and is fixed to the hinge pillar; and a gap portion for arranging a vehicle component at an upper part of a vehicle-interior side of the side sill. The speaker box includes an abutting part abutting the hinge pillar; an upper space portion that bulges inward in a vehicle width direction from the abutting part above the gap portion and that holds the speaker; and an extended space portion that extends downward from the upper space portion and is adjacent to a vehicle-width-direction inner side of the gap portion. A closed space that connects the upper space portion to the extended space portion in the up-down direction is formed, and a vehicle-width-direction dimension in a cross section orthogonal to the vehicle front-rear direction is smaller in a lower portion of the extended space portion than in an upper portion of the extended space portion.

BRIEF DESCRIPTION OF DRAWINGS

FIG. 8A is a perspective view of an outer-side box part as viewed from the front and outside of the vehicle, and FIG. 8B is a perspective view of the outer-side box part as viewed from the front and inside of the vehicle.

DETAILED DESCRIPTION OF THE DRAWINGS

Figure 1:
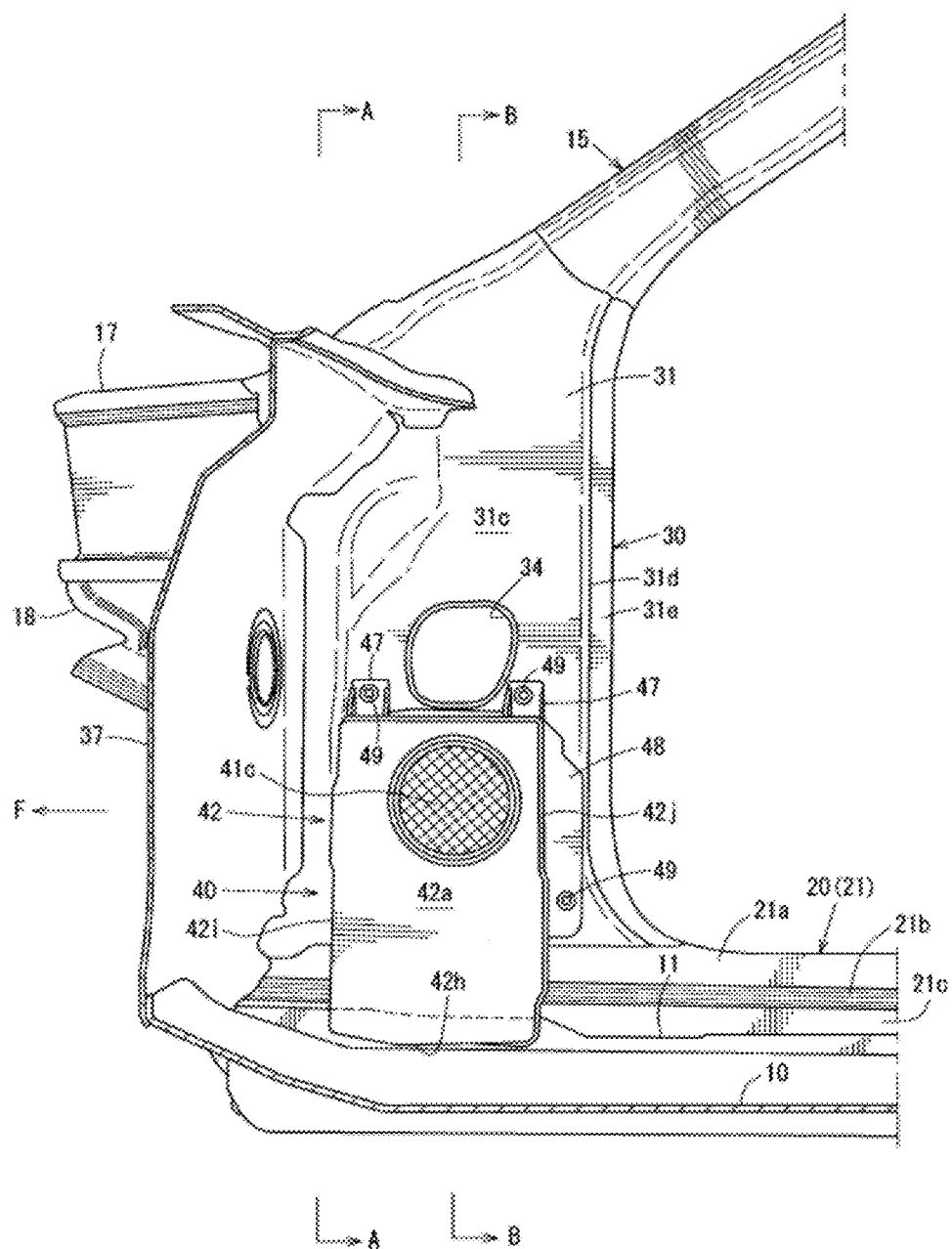
FIG. 1 is a side view of a speaker disposition structure of a vehicle of the present disclosure as viewed from an inside of a vehicle cabin.

The inventors of the present disclosure have recognized problems with conventional speaker disposition structures. Thus, the inventors have developed a new speaker disposition structure that can secure a capacity of a speaker box without cramping a cabin, establish a layout of a vehicle component at a lower part of the vehicle-interior side of a hinge pillar, and improve the bass reproduction efficiency by a decrease in air flow resistance in the speaker box.

A speaker disposition structure of a vehicle according to the present disclosure includes: a hinge pillar extending in the vehicle up-down direction; a side sill fixed to a lower end of the hinge pillar and extending in the vehicle front-rear direction; a speaker box that holds a speaker and is fixed to the hinge pillar in the vicinity of the side sill; and a gap portion for arranging a vehicle component at an upper part of the vehicle-interior side of the side sill, wherein the speaker box includes: an abutting part abutting the hinge pillar; an upper space portion that bulges inward in the vehicle width direction from the abutting part above the gap portion and that holds the speaker; and an extended space portion that extends downward from the upper space portion and is adjacent to the vehicle-width-direction inner side of the gap portion, a closed space that communicates the upper space portion to the extended space portion in the up-down direction is formed, and the extended space portion is formed such that a vehicle-width-direction dimension in a cross section orthogonal to the vehicle front-rear direction is smaller in a lower portion than in an upper portion.

The vehicle component may be a wire harness.

According to the configuration, by providing the extended space portion, the capacity of the speaker box can be secured without cramping the cabin, and a layout of the vehicle component can be secured by the gap portion.

Further, since the vehicle-width-direction dimension of the extended space portion is smaller in the lower portion than in the upper portion, that is, the vehicle-width-direction dimension of the extended space portion is larger in the upper portion than in the lower portion, it is possible to prevent an increase in air flow resistance in the speaker box during sound reproduction from the speaker, and to reproduce expected bass.

In one embodiment of the present disclosure, the extended space portion has an inner wall located on the inner side in the vehicle width direction, and an outer wall located on the outer side in the vehicle width direction, and the inner wall is arranged to be inclined inward of the vehicle cabin, toward the bottom.

According to this configuration, since the inner wall is inclined inward of the vehicle cabin toward the bottom while securing a layout of the vehicle component by the extended space portion adjacent to the vehicle-width-direction inner side of the gap portion, it is possible to secure the capacity of the speaker box by the inclination toward the inside of the vehicle cabin.

In one embodiment of the present disclosure, the extended space portion has the inner wall located on the inner side in the vehicle width direction and the outer wall located on the outer side in the vehicle width direction, and the outer wall has a step-down portion that is stepped down toward the inside of the vehicle cabin, at the lower portion of the gap portion.

According to this configuration, the extended space portion can be provided while avoiding interference with the vehicle component arranged in the gap portion and the side sill located immediately below the gap portion, and the capacity of the speaker box can be secured by the extended space portion.

A speaker disposition structure in accordance with the present disclosure provides advantageous effects, such as making it possible to secure the capacity of the speaker box without cramping the cabin, establish a layout of the vehicle component at a lower part of the vehicle-interior side of the hinge pillar, and improve the bass reproduction efficiency by a decrease in air flow resistance in the speaker box.

Such features allow for securing the capacity of the speaker box without cramping the cabin, establishing a layout of the vehicle component at a lower part of the vehicle-interior side of the hinge pillar, and improving the bass reproduction efficiency by a decrease in air flow resistance in the speaker box is realized by a speaker disposition structure of a vehicle, including: a hinge pillar extending in the vehicle up-down direction; a side sill fixed to a lower end of the hinge pillar and extending in a vehicle front-rear direction; a speaker box that holds a speaker, and is fixed to the hinge pillar in the vicinity of the side sill; and a gap portion for arranging a vehicle component at an upper part of the vehicle-interior side of the side sill, wherein the speaker box includes: an abutting part abutting the hinge pillar; an upper space portion that bulges inward in the vehicle width direction from the abutting part above the gap portion and that holds the speaker; and an extended space portion that extends downward from the upper space portion and is adjacent to the vehicle-width-direction inner side of the gap portion, a closed space that communicates the upper space portion to the extended space portion in the up-down direction is formed, and the extended space portion is formed such that a vehicle-width-direction dimension in a cross section orthogonal to the vehicle front-rear direction is smaller in a lower portion than in an upper portion.

One embodiment of the present disclosure will be described in detail below based on the drawings.

Figure 2:
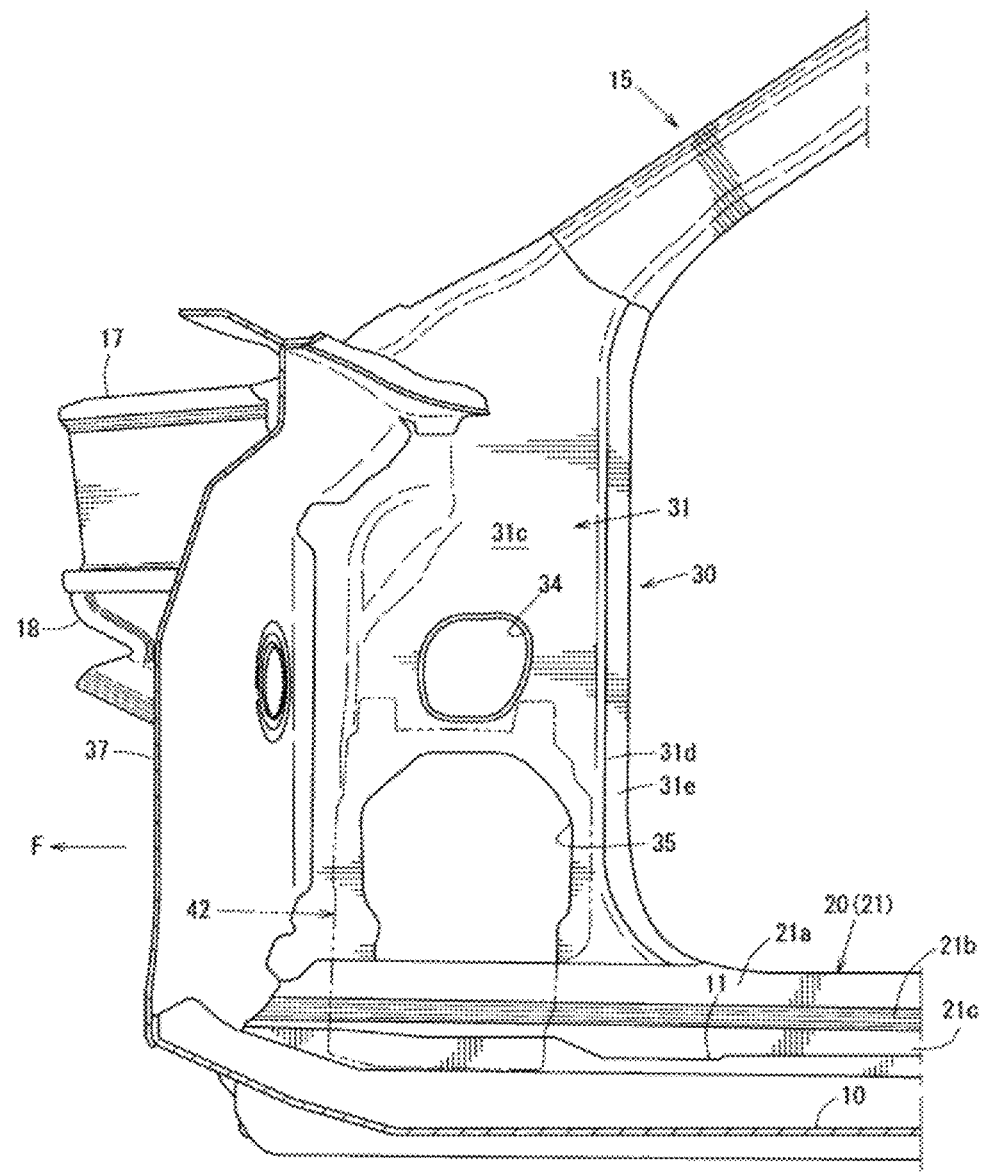
FIG. 2 is a side view showing a state in which a speaker box has been removed from FIG. 1.
Figure 3:
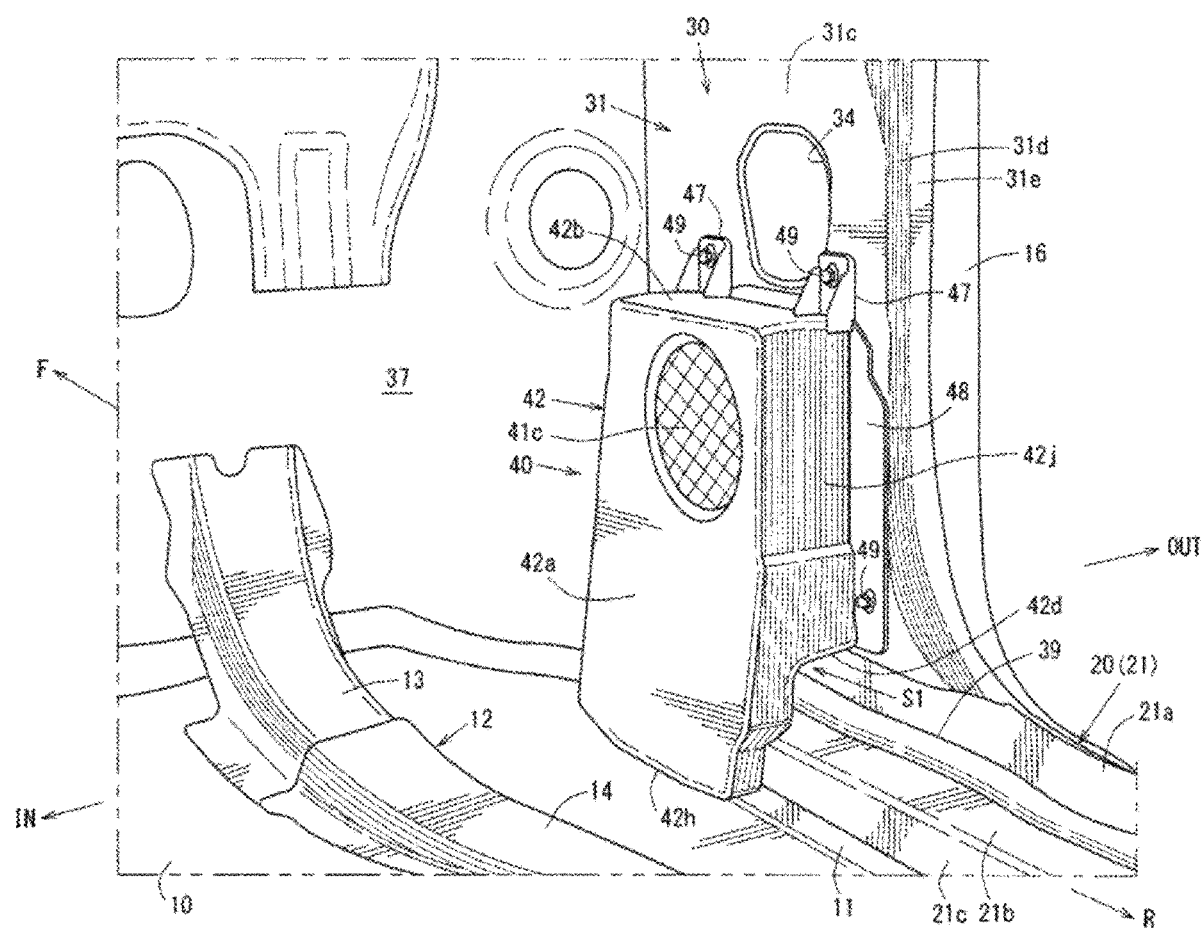
FIG. 3 is a perspective view of the speaker disposition structure of the vehicle as viewed from the inside and rear of the vehicle cabin.

The drawings show a speaker disposition structure of a vehicle, wherein FIG. 1 is a side view of the speaker disposition structure of the vehicle as viewed from an inside of a vehicle cabin, FIG. 2 is a side view showing a state in which a speaker box has been removed from FIG. 1, and FIG. 3 is a side view of the speaker disposition structure of the vehicle as viewed from the inside and rear of the vehicle cabin.

Figure 4:
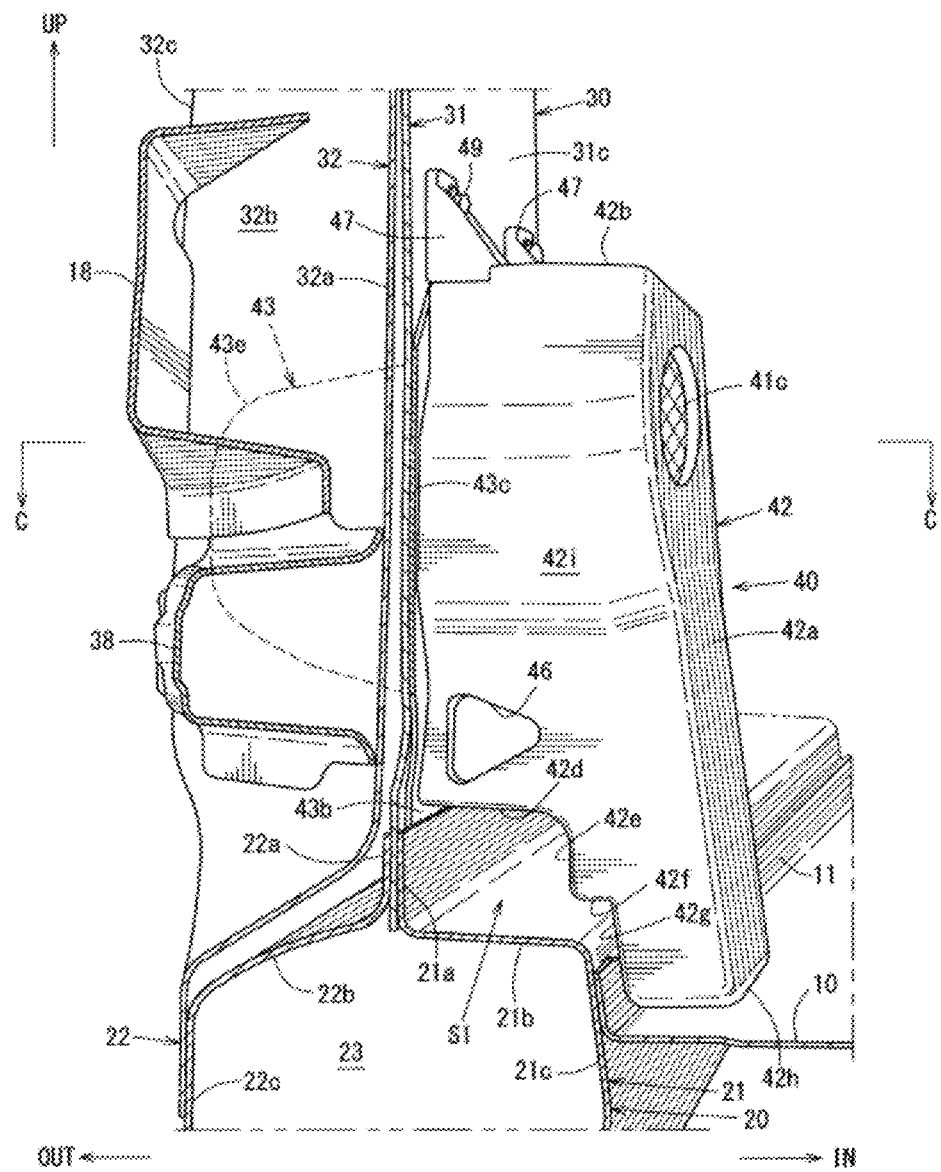
FIG. 4 is an arrow cross-sectional view taken along the A-A line in FIG. 1.
Figure 5:
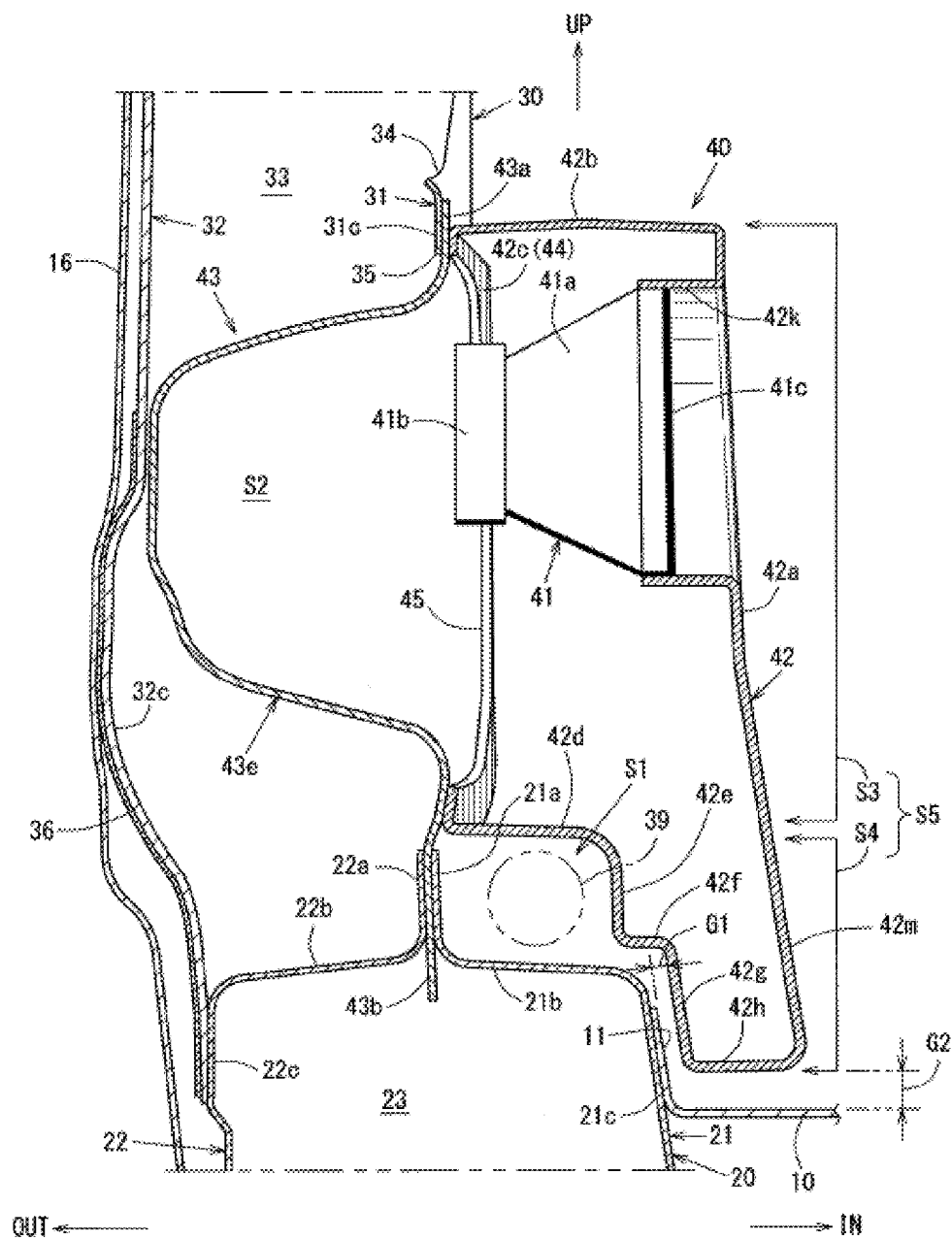
FIG. 5 is an arrow cross-sectional view of essential parts taken along the B-B line in FIG. 1.
Figure 6:
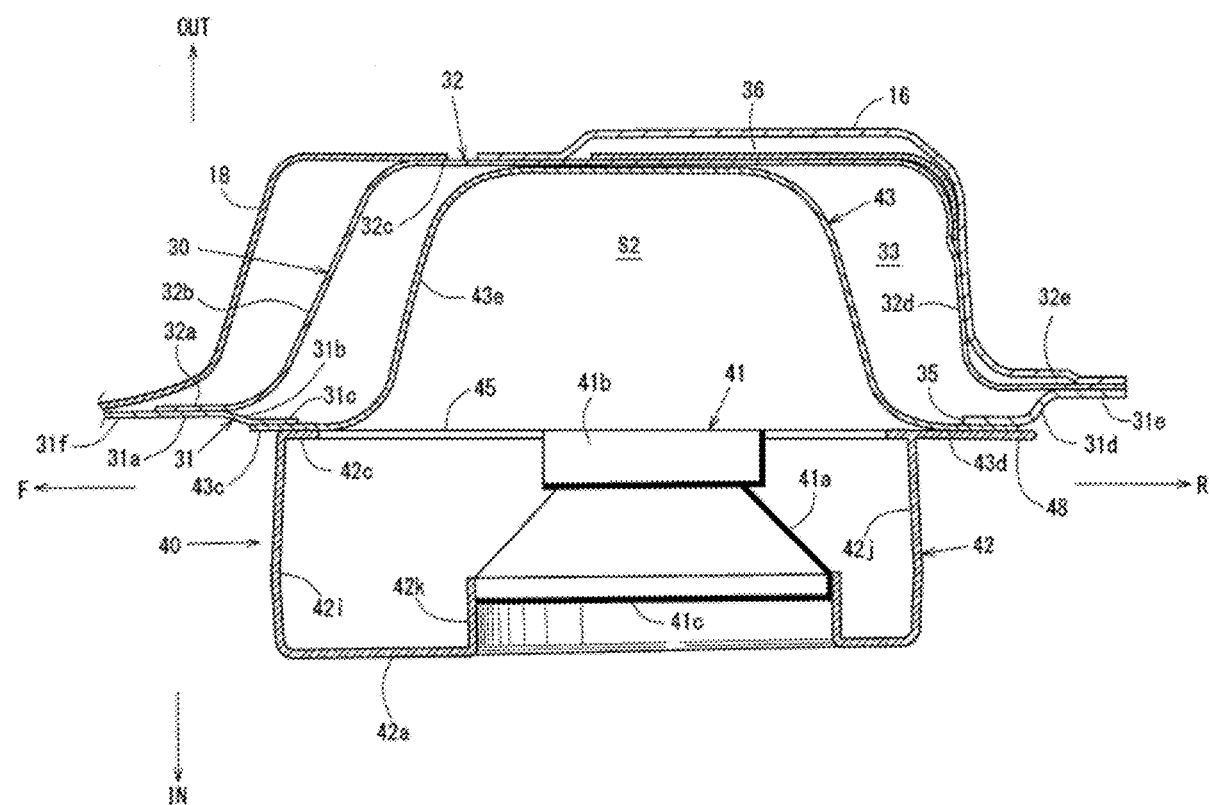
FIG. 6 is an arrow cross-sectional view taken along the C-C line in FIG. 4.

FIG. 4 is an arrow cross-sectional view taken along the A-A line in FIG. 1, FIG. 5 is an arrow cross-sectional view of essential parts taken along the B-B line in FIG. 1, and FIG. 6 is an arrow cross-sectional view taken along the C-C line in FIG. 4. In FIG. 1 and FIG. 2, a floor frame is omitted for convenience of illustration.

First, a front vehicle-body structure of the vehicle will be described before describing the speaker disposition structure.

As shown in FIG. 4 and FIG. 5, a floor panel 10 that forms a floor surface of the vehicle cabin is mounted, and a bent piece 11 rising upward is integrally formed on a vehicle-width-direction end of the floor panel 10.

A side sill 20 is joined and fixed to the bent piece 11 of the floor panel 10.

The side sill 20 is a vehicle body strengthening member that has a side sill closed cross-section 23 extending in the vehicle front-rear direction by joining and fixing a side sill inner 21 and a side sill outer 22 together.

As shown in FIG. 4 and FIG. 5, the side sill inner 21 includes an upper joined flange 21a, an upper wall 21b extending inward in the vehicle width direction from the lower end of the joined flange 21a, an inner wall 21c extending downward from the vehicle-width-direction inner end of the upper wall 21b, a lower wall extending outward in the vehicle width direction from the lower end of the inner wall 21c, and a lower joined flange extending downward from the vehicle-width-direction outer end of the lower wall.

As shown in FIG. 4 and FIG. 5, the side sill outer 22 includes an upper joined flange 22a, an upper wall 22b extending outward in the vehicle width direction from the lower end of the joined flange 22a, an outer wall 22c extending downward from the vehicle-width-direction outer end of the upper wall 22b, a lower wall extending inward in the vehicle width direction from the lower end of the inner wall 22c, and a lower joined flange extending downward from the vehicle-width-direction inner end of the lower wall.

The bent piece 11 of the floor panel 10 is joined and fixed to the inner wall 21c of the side sill inner 21.

Moreover, the upper joined flange 21a of the side sill inner 21 and the upper joined flange 22a of the side sill outer 22 are joined and fixed together. Similarly, the lower joined flange of the side sill inner 21 and the lower joined flange of the side sill outer 22 are joined and fixed together.

As shown in FIG. 3, a floor frame 12 having a hat-shaped cross section is connected to the top face of the floor panel 10. The floor frame 12 has a floor frame front portion 13 and a floor frame rear portion 14, and extends in the vehicle front-rear direction, and the floor frame front portion 13 is attached across a lower portion of a later-described dash panel 37 and a front portion of the floor panel 10.

A floor frame closed cross-section extending in the vehicle front-rear direction is formed between the floor frame rear portion 14 and the floor panel 10, thereby improving the lower vehicle body rigidity.

As shown in FIG. 1 and FIG. 2, provided is a hinge pillar 30 that extends in the vehicle up-down direction between the side sill 20 extending in the vehicle front-rear direction at a vehicle lower portion and a front pillar 15 extending in a diagonal direction at a vehicle upper portion, and that connects the side sill 20 and the front pillar 15.

Here, the front pillar 15 extends diagonally upward and rearward from the front end to the rear end, and the front pillar 15 is a vehicle body strengthening member that has a front pillar closed cross-section extending in the longitudinal direction of the front pillar 15 by joining and fixing a front pillar inner and a front pillar outer together.

As shown in FIG. 1 to FIG. 6, the hinge pillar 30 is a vehicle body strengthening member that has a hinge pillar closed cross-section 33 extending in the vehicle up-down direction by joining and fixing a hinge pillar inner 31 and a hinge pillar outer 32 together, the upper end of the hinge pillar 30 is fixed to the diagonal lower end of the front pillar 15, and the lower end of the hinge pillar 30 is fixed to the side sill 20.

As shown in FIG. 2 and FIG. 6, the hinge pillar inner 31 has a front joined flange 31a, a front-side step portion 31b, an inner wall 31c, a rear-side step portion 31d, a rear joined flange 31e, and also includes a front extending portion 31f extending further forward from the front joined flange 31a.

As shown in FIG. 6, the hinge pillar outer 32 is produced by integrally forming a front joined flange 32a, a front wall 32b, an outer wall 32c, a rear wall 32d, and a rear joined flange 32e to have a hat-shaped cross section in plan view.

The front wall 32b extends outward in the vehicle width direction from the rear end of the front joined flange 32a. The outer wall 32c extends from the vehicle-width-direction outer end of the front wall 32b toward the rear of the vehicle. The rear wall 32d extends inward in the vehicle width direction from the rear end of the outer wall 32c. Further, the rear joined flange 32e extends from the vehicle-width-direction inner end of the rear wall 32d toward the rear of the vehicle.

Furthermore, as shown in FIG. 6, the front joined flange 31a of the hinge pillar inner 31 and the front joined flange 32a of the hinge pillar outer 32 are joined and fixed together, and the rear joined flange 31e of the hinge pillar inner 31 and the rear joined flange 32e of the hinge pillar outer 32 are joined and fixed together to form the hinge pillar 30.

As shown in FIG. 2, an opening 34 is formed at a middle portion in the up-down direction of the inner wall 31c of the hinger pillar inner 31, and an opening 35 for attaching an outer-side box part 43 of a later-described speaker box 40 is formed at a lower portion of the inner wall 31c below the opening 34.

As shown in FIG. 3, FIG. 5 and FIG. 6, vehicle-exterior-side faces of the side sill 20, the front pillar 15 and the hinge pillar 30 are integrally covered with a cab side outer panel 16.

As shown in FIG. 6, on the hinge pillar outer 32 of the hinge pillar 30, a hinge reinforcement 36 is joined and fixed at a portion at which a body-side hinge bracket of a door hinge is attached.

Although only the structure on the right side of the vehicle is shown in the drawings, the side sill 20, the front pillar 15 and the hinge pillar 30 are formed on the right side and left side in a substantially symmetrical structure, and the dash panel 37 connecting front ends of a pair of left and right hinger pillars 30, 30 to each other in the vehicle width direction is mounted as shown in FIG. 1 and FIG. 2.

FIG. 1 and FIG. 2 show an apron reinforcement 17. FIG. 1, FIG. 2, FIG. 4 and FIG. 6 show a connection reinforcement 18 that diagonally connects the apron reinforcement 17 and the hinge pillar 30. FIG. 4 shows a gusset 38 as a high-rigidity member that extends in the front-rear direction and connects a wheel arch for a front wheel and the hinge pillar 30.

Next, the speaker disposition structure of the vehicle will be described in detail.

Figure 7:
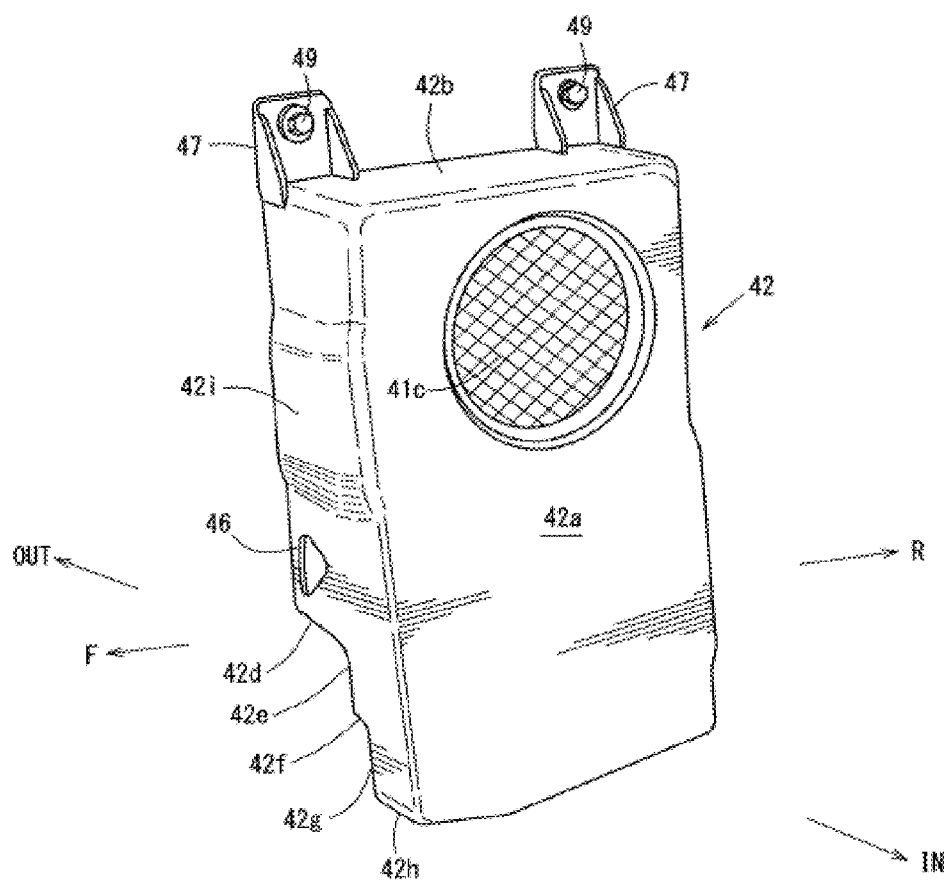
FIG. 7 is a perspective view showing an inner-side box part of the speaker box.

FIG. 7 is a perspective view showing an inner-side box part, FIG. 8A is a perspective view of an outer-side box part as viewed from the front and the vehicle-width-direction outer side of the vehicle, and FIG. 8B is a perspective view of the outer-side box part as viewed from the front and the vehicle-width-direction inner side of the vehicle.

As shown in FIG. 1 and FIG. 3, a bass reflex type speaker box 40 is fixed to the hinge pillar 30 in the vicinity of the side sill 20.

As shown in FIG. 5 and FIG. 6, this speaker box 40 includes an inner-side box part 42 formed of a resin member that holds the speaker 41, and an outer-side box part 43 formed of a sheet metal, located on the vehicle-width direction outer side relative to the inner-side box part 42.

As shown in FIG. 5 and FIG. 6, the speaker 41 includes: a frame 41a having a damper, a cone, etc. therein; a yoke 41b located at a neck portion of the frame 41a; and a speaker grill 41c attached to the open side of the cone.

Meanwhile, as shown in FIG. 5, a gap portion S1 in which a wire harness 39 as a vehicle component is to be placed is formed at a vehicle-interior-side upper part of the side sill 20, more specifically, above the upper wall 21b of the side sill inner 21.

As shown in FIG. 5, FIG. 6 and FIG. 8, the outer-side box part 43 includes an upper-side flange 43a, a lower-side flange 43b, a front-side flange 43c, a rear-side flange 43d, and a bulge 43e bulging out from the respective flanges to the vicinity of the outer wall 32c of the hinge pillar outer 32.

The bulge 43e is formed in a dorm shape, and a hollow portion S2 is formed inside the bulge 43e.

The upper-side flange 43a, the front-side flange 43c and the rear-side flange 43d among the respective flanges 43a, 43b, 43c, 43d are fixed to a vehicle-width-direction inner-side face of the inner wall 31c of the hinge pillar inner 31, at the edge of the opening 35 shown in FIG. 2, by joining means such as spot welding (see FIG. 5 and FIG. 6).

As shown in FIG. 5, the lower-side flange 43b of the outer-side box part 43 is fixed to the side sill 20 that is a vehicle-body framework member. More specifically, the lower-side flange 43b is interposed and fixed between the upper joined flange 21a of the side sill inner 21 and the upper joined flange 22a of the side sill outer 22.

As shown in FIG. 1 and FIG. 3 to FIG. 7, and particularly in FIG. 5, the inner-side box part 42 includes a front face wall 42a, an upper wall 42b, a rear face wall 42c, an upper transverse wall 42d, an upper vertical wall 42e, a lower transverse wall 42f, a lower vertical wall 42g, a lower wall 42h, and a front wall 42i and a rear wall 42j shown in FIG. 6.

As shown in FIG. 5, the front face wall 42a forms a front face on the vehicle-width-direction inner side of the speaker box 40. A cylindrical speaker support 42k extending toward the inside of a space portion inside the inner-side box part 42, that is, toward the vehicle-width-direction outer side, is integrally formed at an upper portion of the front face wall 42a, and the speaker 41 is supported by this support 42k.

The upper wall 42b extends outward in the vehicle width direction from the upper end of the front face wall 42a. The rear face wall 42c extends downward from the vehicle-width-direction outer end of the upper wall 42b.

The rear face wall 42c as a whole forms an abutting part 44 that abuts the hinge pillar inner 31 through the flanges 43a to 43d of the outer-side box part 43. Further, formed in the rear face wall 42c is a communication opening 45 that communicates the hollow portion S2 on the outer-side box part 43 side to an upper space portion S3 on the inner-side box part 42 side.

Here, the upper space portion S3 is a space portion that bulges inward in the vehicle width direction from the abutting part 44 above the gap portion S1, and holds the speaker 41 through the speaker support 42k.

The gap portion S1 is a gap surrounded by the upper joined flange 21a and the upper wall 21b of the side sill inner 21 and the upper transverse wall 42d and upper vertical wall 42e of the inner-side box part 42, and extending in the vehicle front-rear direction.

As shown in FIG. 5, the upper transverse wall 42d extends inward in the vehicle width direction from the lower end of the rear face wall 42c. Moreover, the upper vertical wall 42e extends downward from the vehicle-width-direction inner end of the upper transverse wall 42d. Further, the lower transverse wall 42f extends inward in the vehicle width direction from the lower end of the upper vertical wall 42e. Furthermore, the lower vertical wall 42g extends downward from the vehicle-width-direction inner end of the lower transverse wall 42f. Additionally, the lower wall 42h extends inward in the vehicle width direction from the lower end of the lower vertical wall 42g, and connects the lower end of the lower vertical wall 42g to front face wall 42a.

As shown in FIG. 6 and FIG. 7, the front wall 42i closes the front of the inner-side box part 42 surrounded by the parts 42a to 42h. As shown in FIG. 3 and FIG. 6, the rear wall 42j closes the rear of the inner-side box part 42 surrounded by the parts 42a to 42h.

As shown in FIG. 4 and FIG. 7, since the speaker box 40 of this embodiment is a bass reflex type enclosure, a port opening 46 is formed to open in a lower part of the front wall 42i of the inner-side box part 42.

As shown in FIG. 3, a pair of front and rear mounting seats 47, 47 are integrally formed at a top portion of the inner-side box part 42, and a flange 48 that protrudes rearward of the vehicle and extends in the up-down direction is integrally formed at a rear portion of the inner-side box part 42, on the upper side of the upper transverse wall 42d. Moreover, the mounting seats 47 and the flange 48 are fastened and fixed to the hinge pillar inner 31 using fastening members 49 such as bolts and nuts.

As shown in FIG. 5, on the lower side of the inner-side box part 42 relative to the upper transverse wall 42d, an extended space portion S4 that extends downward from the upper space portion S3 and is adjacent to the vehicle-width-direction inner side of the gap portion S1 is formed.

This extended space portion S4 is a space portion surrounded by the upper vertical wall 42e, the lower transverse wall 42f, the lower vertical wall 42g, the lower wall 42h, and the lower portions of the front surface wall 42a, the front wall 42i and the rear wall 42j corresponding to these parts 42e to 42h.

As shown in FIG. 5, a closed space S5 that connects the upper space portion S3 to the extended space portion S4 in the up-down direction is formed.

Moreover, as shown in FIG. 5, the extended space portion S4 is formed such that the vehicle-width-direction dimension in a cross section orthogonal to the vehicle front-rear direction (namely, a vehicle-width-direction cross section) is smaller in the lower portion than in the upper portion. In other words, the extended space portion S4 is formed such that, in the cross section orthogonal to the vehicle front-rear direction, the vehicle-width-direction dimension becomes smaller toward the bottom.

For the structure in which the vehicle-width-direction dimension is smaller in the lower portion than in the upper portion, the vehicle-width-direction dimension may become smaller stepwise or may become smaller continuously, and this embodiment adopts a structure in which the vehicle-width-direction dimension becomes smaller stepwise as shown in FIG. 5.

The extended space portion S4 is provided so as to secure the capacity of the speaker box 40 without cramping the cabin (driver room), and to secure a layout of the wire harness 39 as a vehicle component by the gap portion S1. Further, by forming the extended space portion S4 such the vehicle-width-direction dimension is smaller in the lower portion than in the upper portion, an increase in air flow resistance in the speaker box 40 during reproducing sound from the speaker 41 is prevented so as to reproduce expected bass.

As shown in FIG. 5, the extended space portion S4 has an inner wall 42m located on the vehicle-width-direction inner side (see the lower portion of the front face wall 42a corresponding to the region of the extended space portion S4), and an outer wall located on the vehicle-width-direction outer side (see each part of the upper vertical wall 42e, the lower transverse wall 42f, and the lower vertical wall 42g).

As shown in FIG. 5, the inner wall 42m is arranged to be inclined inward of the vehicle cabin (that is, inward in the vehicle width direction), towards the bottom. Thus, this configuration secures the capacity of the speaker box 40 as the inner wall 42m is inclined inward of the vehicle cabin, towards the bottom.

Furthermore, as shown in FIG. 5, in the outer wall (the upper vertical wall 42e, the lower transverse wall 42f, the lower vertical wall 42g) of the extended space portion S4, a step-down portion (the lower transverse wall 42f) that is stepped down toward the inside of the vehicle cabin is provided at the lower portion of the gap portion S1. Thus, this configuration provides the extended space portion S4 while avoiding interference with the side sill 20 (more specifically, the side sill inner 21) located immediately below the gap portion S1, and secures the capacity of the speaker box 40 by the extended space portion S4.

As shown in FIG. 5, a gap G1 in the vehicle width direction is formed between the lower vertical wall 42g of the inner-side box part 42 and the inner wall 21c of the side sill inner 21 and the bent piece 11 of the floor panel 10.

Furthermore, as shown in FIG. 5, a gap G2 in the up-down direction is formed between the lower wall 42h of the inner-side box part 42 and the floor panel 10.

The gaps G1 and G2 are formed so as to prevent occurrence of abnormal noise due to vibration when the vehicle is traveling.

In the drawings, an arrow F indicates the direction toward the front of the vehicle, an arrow R indicates the direction toward the rear of the vehicle, an arrow IN indicates the direction toward the inner side in the vehicle width direction, an arrow OUT indicates the direction toward the outer side in the vehicle width direction, and an arrow UP indicates the direction toward the upper side of the vehicle.

Thus, the speaker disposition structure of the vehicle of the embodiment includes: the hinge pillar 30 extending in the vehicle up-down direction; the side sill 20 fixed to the lower end of the hinge pillar 30 and extending in the vehicle front-rear direction; the speaker box 40 that holds the speaker 41 and is fixed to the hinge pillar 30 in the vicinity of the side sill 20; and the gap portion S1 for arranging the vehicle component (see the wire harness 39) at the upper part of the vehicle-interior side of the side sill 20, wherein the speaker box 40 includes: the abutting part 44 abutting the hinge pillar 30; the upper space portion S3 that bulges inward in the vehicle width direction from the abutting part 44 above the gap portion S1 and that holds the speaker 41; and the extended space portion S4 that extends downward from the upper space portion S3 and is adjacent to the vehicle-width-direction inner side of the gap portion S1, the closed space S5 that connects the upper space portion S3 to the extended space portion S4 in the up-down direction is formed, and the extended space portion S4 is formed such that the vehicle-width-direction dimension in a cross section orthogonal to the vehicle front-rear direction is smaller in the lower portion than in the upper portion (see FIG. 1 and FIG. 5).

According to this configuration, the extended space portion S4 is provided so as to secure the capacity of the speaker box 40 without cramping the cabin, and to secure a layout of the vehicle component (wire harness 39) by the gap portion S1.

Moreover, since the vehicle-width-direction dimension of the extended space portion S4 is smaller in the lower portion than in the upper portion, it is possible to prevent an increase in air flow resistance in the speaker box 40 during reproducing sound from the speaker 41, and to reproduce expected bass.

Further, in one embodiment of the present disclosure, the extended space portion S4 has the inner wall 42m located on the vehicle-width-direction inner side, and the outer wall located on the vehicle-width-direction outer side (see the upper vertical wall 42e, the lower transverse wall 42f, and the lower vertical wall 42g), and the inner wall 42m is arranged to be inclined inward of the vehicle cabin, toward the bottom (see FIG. 5).

According to this configuration, since the inner wall 42m is inclined inward of the vehicle cabin toward the bottom while securing a layout of the vehicle component (wire harness 39) by the extended space portion S4 adjacent to the vehicle-width-direction inner side of the gap portion S1, it is possible to secure the capacity of the speaker box 40 by the inclination toward the inside of the vehicle cabin.

Furthermore, in one embodiment of the present disclosure, the extended space portion S4 has the inner wall 42m located on the vehicle-width-direction inner side and the outer wall located on the vehicle-width-direction outer side (the upper vertical wall 42e, the lower transverse wall 42f, and the lower vertical wall 42g), and the outer wall has a step-down portion (see the lower transverse wall 42f) that is stepped down toward the inside of the vehicle cabin, at the lower portion of the gap portion S1 (see FIG. 5).

Thus, according to this configuration, the extended space portion S4 can be provided while avoiding interference with the vehicle component (the wire harness 39) arranged in the gap portion S1 and the side sill 20 located immediately below the gap portion S1, and the capacity of the speaker box 40 can be secured by the extended space portion S4.

For correspondence between the configuration of the present disclosure and the embodiment, the vehicle component of the present disclosure corresponds to the wire harness 39 of the embodiment, and similarly the outer wall of the extended space portion S4 corresponds to the upper vertical wall 42e, the lower transverse wall 42f and the lower vertical wall 42g, and the step-down portion corresponds to the lower transverse wall 42f, but the present disclosure is not necessarily limited to only the configuration of the embodiment.

For example, as the structure of the extended space portion S4 in which the vehicle-width-direction dimension in the cross section orthogonal to the vehicle front-rear direction is smaller in the lower portion than in the upper portion, although the embodiment adopts a structure in which the vehicle-width-direction dimension becomes smaller stepwise, the vehicle-width-direction dimension may become smaller continuously.

INDUSTRIAL APPLICABILITY

As described above, the present disclosure is useful for a speaker disposition structure of a vehicle, including: a hinge pillar extending in the vehicle up-down direction; a side sill fixed to a lower end of the hinge pillar and extending in the vehicle front-rear direction; a speaker box that holds a speaker and is fixed to the hinge pillar in the vicinity of the side sill; and a gap portion for arranging a vehicle component at an upper part of the vehicle-interior side of the side sill.

REFERENCE SIGNS LIST

20 Side sill
30 Hinge pillar
39 Wire harness
40 Speaker box
41 Speaker
42e Upper vertical wall
42f Lower transverse wall
42g Lower vertical wall
42m Inner wall
44 Abutting part
S1 Gap portion
S3 Upper space portion
S4 Extended space portion
S5 Space

The invention claimed is:
1. A speaker disposition structure of a vehicle, the speaker disposition structure comprising:
 a hinge pillar extending in a vehicle up-down direction;
 a side sill fixed to a lower end of the hinge pillar and extending in a vehicle front-rear direction;
 a speaker box that holds a speaker and is fixed to the hinge pillar; and
 a gap portion for arranging a vehicle component at an upper part of a vehicle-interior side of the side sill, wherein
 the speaker box includes:
  an abutting part abutting the hinge pillar;
  an upper space portion that bulges inward in a vehicle width direction from the abutting part above the gap portion and that holds the speaker; and
  an extended space portion that extends downward from the upper space portion and is adjacent to a vehicle-width-direction inner side of the gap portion,
 a closed space that connects the upper space portion to the extended space portion in the up-down direction is formed, and
 a vehicle-width-direction dimension in a cross section orthogonal to the vehicle front-rear direction is smaller in a lower portion of the extended space portion than in an upper portion of the extended space portion.

2. The speaker disposition structure according to claim 1, wherein
the extended space portion has an inner wall located on an inner side in the vehicle width direction, and an outer wall located on an outer side in the vehicle width direction, and
the inner wall is inclined inward of a vehicle cabin and toward a bottom of the vehicle cabin.

3. The speaker disposition structure according to claim 1, wherein
the extended space portion has an inner wall located on an inner side in the vehicle width direction, and an outer wall located on an outer side in the vehicle width direction, and
the outer wall has a step-down portion that is stepped down, toward an inside of a vehicle cabin, at a lower portion of the gap portion.

4. The speaker disposition structure according to claim 2, wherein the outer wall has a step-down portion that is stepped down, toward an inside of a vehicle cabin, at a lower portion of the gap portion.

5. The speaker disposition structure according to claim 1, wherein
the upper space portion includes an upper wall that extends outward in the vehicle width direction from a front face wall, and
the abutting part extends downward from the upper wall.

6. The speaker disposition structure according to claim 1, wherein the extended space portion is surrounded by a plurality of walls.

7. The speaker disposition structure according to claim 6, wherein the plurality of walls includes an upper vertical wall, a lower vertical wall, a lower transverse wall, a lower wall, and lower portions of a front surface wall, a front wall and a rear wall.

8. The speaker disposition structure according to claim 1, wherein
the gap portion is a gap surrounded by an upper joined flange and the upper wall of the side sill, and an upper transverse wall and an upper vertical wall of an inner-side box, and
the gap portion extends in the vehicle front-rear direction.

9. A speaker disposition structure of a vehicle, the speaker disposition structure comprising:
a hinge pillar extending in a vehicle up-down direction;
a side sill fixed to a lower end of the hinge pillar and extending in a vehicle front-rear direction; and
a speaker box that holds a speaker and is fixed to the hinge pillar, the speaker box including:
a rear face wall abutting the hinge pillar;
an upper space that bulges inward in a vehicle width direction from the rear face wall, the upper space holding the speaker; and
an extended space that extends downward from the upper space, wherein
a vehicle-width-direction dimension in a cross section orthogonal to the vehicle front-rear direction is smaller in a lower portion of the extended space than in an upper portion of the extended space.

10. The speaker disposition structure according to claim 9, wherein
the extended space has an inner wall located on an inner side in the vehicle width direction, and an outer wall located on an outer side in the vehicle width direction, and
the inner wall is inclined inward of a vehicle cabin and toward a bottom of the vehicle cabin.

11. The speaker disposition structure according to claim 10, wherein the outer wall has a step-down portion that is stepped down toward an inside of a vehicle cabin.

12. The speaker disposition structure according to claim 9, wherein
the extended space has an inner wall located on an inner side in the vehicle width direction, and an outer wall located on an outer side in the vehicle width direction, and
the outer wall has a step-down portion that is stepped down toward an inside of a vehicle cabin.

13. The speaker disposition structure according to claim 9, wherein
the upper space includes an upper wall that extends outward in the vehicle width direction from a front face wall, and
the rear face wall extends downward from the upper wall.

14. The speaker disposition structure according to claim 9, wherein the extended space is surrounded by a plurality of walls.

15. The speaker disposition structure according to claim 14, wherein the plurality of walls includes an upper vertical wall, a lower vertical wall, a lower transverse wall, a lower wall, and lower portions of a front surface wall, a front wall and a rear wall.

16. The speaker disposition structure according to claim 9, further comprising:
a gap for arranging a vehicle component at an upper part of a vehicle-interior side of the side sill, wherein
the gap is surrounded by an upper joined flange and the upper wall of the side sill, and an upper transverse wall and an upper vertical wall of an inner-side box, and
the gap extends in the vehicle front-rear direction.

17. A speaker disposition structure, comprising:
a hinge pillar;
a side sill fixed to hinge pillar;
a gap adjacent to an upper wall of the side sill; and
a speaker box fixed to the hinge pillar, the speaker box including:
a rear face wall abutting the hinge pillar;
an upper space that bulges inward from the rear face wall above the gap, the upper space holding the speaker; and
an extended space that extends downward from the upper space and is adjacent to the gap.

18. The speaker disposition structure according to claim 17, wherein the extended space is surrounded by a plurality of walls.

19. The speaker disposition structure according to claim 18, wherein the plurality of walls includes an upper vertical wall, a lower vertical wall, a lower transverse wall, a lower wall, and lower portions of a front surface wall, a front wall and a rear wall.

20. The speaker disposition structure according to claim 17, wherein the gap is surrounded by an upper joined flange and the upper wall of the side sill, and an upper transverse wall and an upper vertical wall of an inner-side box.

* * * * *